Patented Apr. 14, 1953

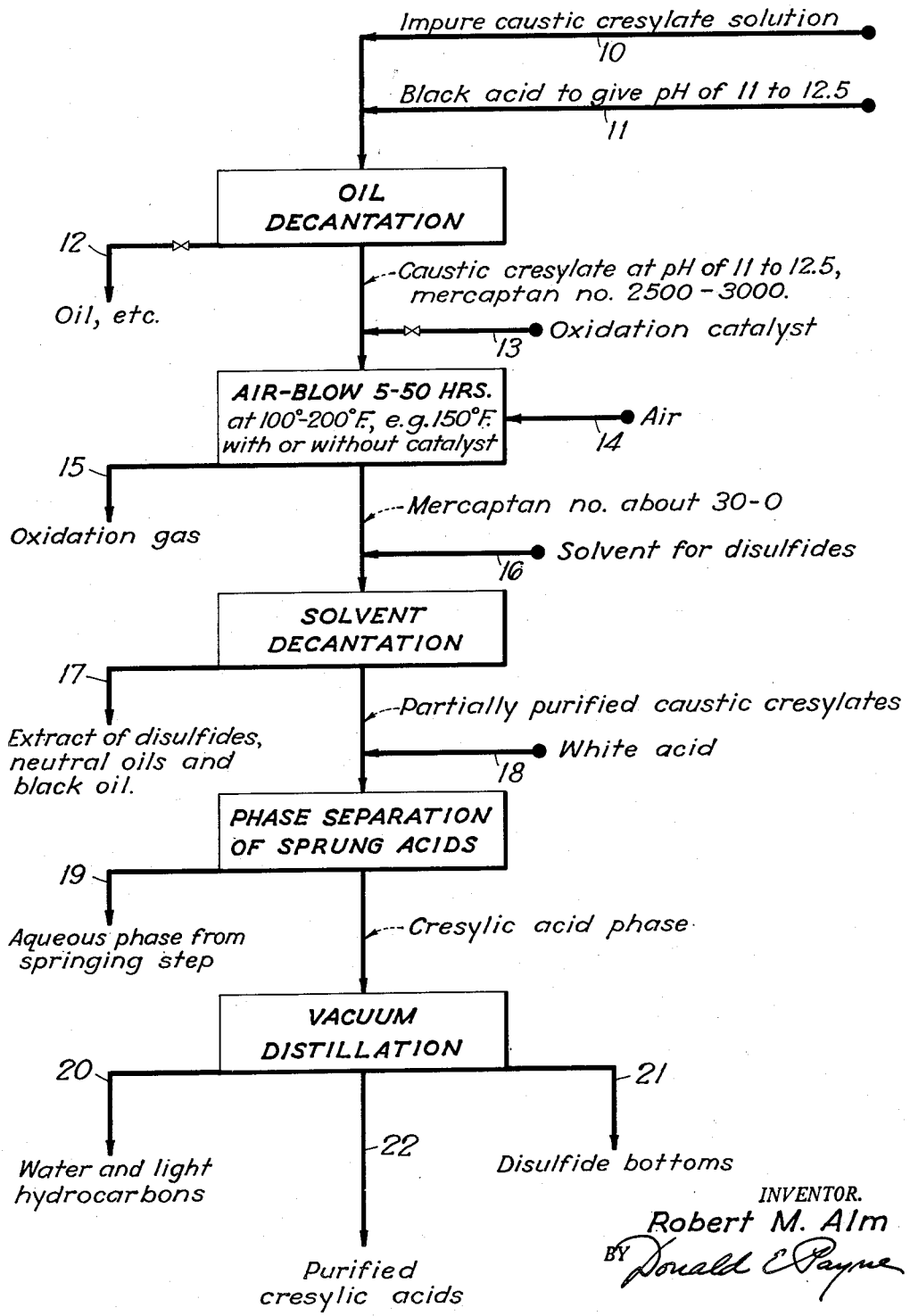

2,635,120

UNITED STATES PATENT OFFICE 2,635,120

OBTAINING PURIFIED PHENOLS AND CRESOLS OF PETROLEUM ORIGIN

Robert M. Alm, Highland, Ind., assignor to Standard Oil Company, Chicago, Ill., a corporation of Indiana Application March 29, 1950, Serial No. 152,679

7 Claims. (Cl. 260—627)

This invention relates to obtaining purified phenols and cresols of petroleum origin and it pertains more particularly to an improved process for refining a so-called caustic cresylate solution containing materials extracted from petroleum refinery cracked naphtha distillates when said distillates are scrubbed with aqueous caustic solutions.

It has long been known that phenol and cresols, herein generically referred to as cresylic acids, may be obtained from cracked gasoline by washing with an aqueous caustic solution (Ind. Eng. Chem. Vol. 16, No. 6, June 1924, page 587). The product obtained by acidifying a caustic wash liquid is called "petroleum cresylic acid" and in this specification cresylic acids should be understood as including phenol and perhaps xylenols as well as cresols per se. Cresylic acids from petroleum are characterized by the presence of a considerable number of impurities, chiefly sulfur compounds, which make them unsuitable for many purposes. A large number of patents (e. g. 2,163,227) have been issued on various processes for refining crude petroleum cresylic acids, but all of such processes are open to one or more serious objections. For example, in prior processes the air blowing of caustic cresylate has required a long period of time even in the presence of catalysts, and in many cases was not effective for converting all mercaptan surfur to disulfides. An object of my invention is to provide an improved method of purifying petroleum cresylic acids which will be simpler, less expensive and more effective than processes heretofore employed.

A further object of the invention is to avoid the necessity of an original steaming step (which was said to be essential in U. S. 2,163,227). A further object is to minimize the expense of acid employed for springing and to provide a process which can utilize so-called black acid which is produced in refinery operations and which currently constitutes a nuisance because of the difficulties involved in its purification and reconcentration. Other objects of the invention will be apparent from the following detailed description.

I have found that the caustic cresylate solutions obtained from cracked naphtha extraction plants always contain considerable excess alkalinity, their hydrogen ion concentration being at least about pH 13, and I have found that such solutions can be partially neutralized to approximately pH 11 without effecting any springing of cresols. This partial neutralization may require about 70% of the total amount of acid required for complete springing. Extensive research and commercial operations have demonstrated that such a partial neutralization of the original caustic cresylate solution to a pH in the range of about 11 to 12.5 has a remarkable and almost unbelievable effect on the rate and extent of conversion of mercaptans to disulfides in the air blowing step. I have also discovered that black acids may be employed in the partial neutralization without impairing the quality of the ultimate cresylic acid product.

In practicing my invention, I neutralize the spent caustic cresylate solution, preferably with black sulfuric acid, to a pH in the range of 11 to 12.5, a pH approximating 11 (just short of the amount required for initiating springing) being preferred when no oxidation catalyst is employed, and a pH of about 12 to 12.5 being preferred when oxidation catalysts are employed. This partial neutralization may liberate some neutral oil and any such oil may be removed at this point, ordinarily it is removed at a subsequent stage in the process. It is surprising that cresylic acids are not released at acidities of pH 11, but it appears that any free cresylic acid which may be present under such conditions is dissolved in the aqueous caustic cresylate and thus not lost in any decanted oil.

The partially neutralized aqueous caustic cresylate which perhaps contains some free but unsprung cresylic acid is then oxidized by blowing with air or other oxygen-containing gas under conditions to convert substantially all of the mercaptans to disulfides. At the particular pH of the partially neutralized material, such air blowing can be effected in a relatively short time, the order of 5 to 50 hours, even in the absence of an oxidation catalyst. By using an oxidation catalyst, such as nickel cresylate, nickel hydroxide, nickel sulfide, etc., or other known types of oxidation catalysts, such as hydroquinone, the time required for substantially complete conversion of mercaptans to disulfides is still further decreased. The blowing is usually effected until the mercaptan number is reduced to not more than 30 and is preferably extended to obtain a substantially zero mercaptan number.

After the oxidation step, which may be effected by air blowing at about 100 to 200° F., e. g. about 150° F., at atmosphere or slightly superatmosphere pressure for a period usually in the range of about 5 to 50 hours, the air blown solution is washed with a solvent for disulfides, such as naphtha, in order to remove neutral oils, including the black materials introduced with the black acid, and the bulk of the disulfides. After the washing step, the air blown solution is sprung with dilute white acid and the sprung cresylic acids are separated and subjected to vacuum distillation for removing water and light hydrocarbons (when present) as well as disulfide bottoms from the purified cresylic acids. In commercial operations, cresylic acids have thus been obtained with a final sulfur content as low as .062%, which is an enormous improvement over processes heretofore employed for this purpose.

The invention will be more clearly understood from the following detailed description read in conjunction with the accompanying drawing which forms a part of this specification and which is a schematic flow sheet illustrating the essential sequence of steps to be employed.

In this example, a crude caustic cresylate solution 10 is obtained by the caustic washing of a cracked naphtha fraction boiling chiefly in the range of 200 to 400° F. with an aqueous caustic, said solution containing about 25% by weight of sodium hydroxide. The caustic concentration is not critical and may be in the range of 10 to 50% or more by weight, and potassium hydroxide may be employed instead of sodium hydroxide. The extract may be substantially saturated with cresylic acids in the form of caustic cresylates and mercaptans in the form of mercaptides. The solution also contains some entrained or solutized oil.

To about 36,000 gallons of such a caustic cresylate solution initially having a pH of about 13, about 5,400 gallons of black acid 11 is added, this black acid being a sulfuric acid of about 40% concentration previously used for treating petroleum oils and which is black because of tarry materials resulting from the treating process. This partial neutralization brings the pH of the caustic cresylate solution to about 11.6 and it may liberate some oil which may be separated by decantation from the aqueous caustic cresylate, any decanted oil 12 containing some of the black components of the sulfuric acid as well as a part of the oil initially solutized in the crude caustic solution.

In this example, about 300 pounds of nickel sulfate is added to the partially neutralized caustic cresylate solution to serve as an oxidation catalyst. The catalyst-containing partially neutralized caustic cresylate solution is then blown with air 14 for a period of less than 50 hours at temperatures ranging from 110 to 150° F., such air blowing step decreasing the mercaptan number of the cresylate solution from about 2800 to zero.

The "sweetened" caustic cresylates in which mercaptans have been substantially all converted into disulfides are then washed with two 3,000 gallon dumps of a light hydrocarbon solvent 16 such as naphtha for removing as extract 17 most of the disulfides, neutral oil and black oil introduced with the original black acid. The washing step not only removes about 90 to 95% of the disulfides, but it also helps to eliminate any neutral oils which were not removed in any first oil decantation step.

The caustic cresylates which have thus been partially purified are ready for the "springing" step, the cresylic acids being sprung by addition of 2300 gallons of white sulfuric acid 18 of commercial purity and about 40% concentration. The aqueous phase 19 from the springing step is withdrawn from the sprung cresylic acids. The latter are then subjected to vacuum distillation to remove a first overhead fraction 20 consisting largely of water and light hydrocarbons and to leave disulfide bottoms 21, the purified cresylic acids 22 being withdrawn as the main product fraction of the vacuum distillation step. The sprung acids prior to vacuum distillation in this example have a total sulfur content of 0.313%, a neutral oil content of 2%, a copper number of 0, a specific gravity of 1.052, a water content of 14.4%, and a pH of 9.1; the purified cresylic acid obtained by vacuum distillation had a sulfur content of only .062% and it was substantially free from water, neutral oil and mercaptans so that it is characterized by a copper number below 10.

The vacuum distillation is preferably effected at a temperature below 265° F. but even at relatively high vacuum and low temperature some disulfides are converted back to mercaptans. In commercial operations distillation pressures of the order of 20 to 40 millimeters have been employed. In order to obtain a product of low sulfur and low mercaptan number, it may be necessary or advantageous to reconvert mercaptans back to disulfides during the course of the distillation by interrupting the distillation and introducing a blowing step. No novelty is claimed in this particular feature per se since the blowing of cresylic acids during distillation has long been known to those skilled in the art (note U. S. 1,199,271).

As previously pointed out, the initial partial neutralization may be effected with a black acid which is a petroleum refinery by-product contaminated with a tarry material and neutral oils which may be present in the acid to the extent of about 10 to 20%. These acid contaminants are eliminated along with neutral oils released from the caustic cresylate in the partial neutralization step. While it is thus highly advantageous to so utilize a waste refinery by-product, it should be understood that the initial partial neutralization and also the springing step may be effected by the use of any other acid known to be suitable for that purpose. Also, it should be understood that amounts and concentrations of acids may be varied throughout a wide range provided that such amounts and concentrations are used to give the defined hydrogen ion concentration or pH value.

A remarkable effect of the partial neutralization on the rate of air oxidation and extent of reduction in mercaptan number (conversion of mercaptans to disulfides) is shown by the following data wherein different samples of a caustic cresylate solution having a mercaptan number of 2800 were air blown at 140° F. for the indicated time without neutralization and with partial neutralization to pH 12.3 and to pH 11.6, respectively, both in the absence of catalyst and in the presence of such catalysts as hydroquinone and nickel sulfide.

| Catalyst | pH | Time, Hrs. | Mercaptan No. |
|---|---|---|---|
| None | >13.0 | 21 | 2,100 |
| Do | 12.3 | 21 | 340 |
| Do | 11.3 | 21 | 15 |
| Hydroquinone, 0.1% | >13.0 | 15.5 | 1,400 |
| Do | 12.3 | 10.5 | 30 |
| Do | 11.6 | 13 | 50 |
| Nickel Sulfide, 0.1% | >13 | 22 | >100 |
| Do | 12.8 | 14.75 | 80 |
| Do | 12.5 | 8.5 | 50 |
| Do | 12.3 | 4.5 | 20 |
| Do | 12.0 | 4.5 | 20 |
| Do | 11.6 | 5.33 | 50 |
| Do | 11.3 | 5.5 | 75 |

These data show that in the absence of catalyst best results are obtained as the hydrogen ion concentration approaches pH 11, i. e. when the neutralization is carried as far as practicable without actually springing any cresylic acids. In the presence of each of the catalysts, however, optimum mercaptan number reduction was obtained with a hydrogen ion concentration closer to pH 12. The particular catalysts tested are given by way of example, and it should be understood that any other catalysts known to promote oxidation of mercaptans to disulfides may be employed. I have found nickel cresylate and nickel hydroxide to be among the most effective although the slurry formed by addition of nickel sulfate to the cresylate solution is almost as effective. Nickel sulfide and the nickel sulfide slurry formed by mixing solutions of sodium hydroxide and nickel sulfate are somewhat less effective. The hydroquinone is an example of such oxidation catalysts which have long been known to those skilled in the art and generally characterized as a benzenoid compound containing at least two substituted groups of which one at least is preferably an amino or hydroxyl group (note U. S. 2,015,038). While the amount of catalyst in the above tests was .1% by weight, the amounts may be varied from substantially zero or trace amounts up to .5% or more, amounts preferably being of the order of .02 to .2 weight per cent.

The temperature of the air oxidation in my process is not critical and although I prefer to employ temperatures in the range of 100 to 200° F., it is possible to employ somewhat higher temperatures.

By using a naphtha solvent for washing the air blown caustic cresylate solution prior to the springing step, I can remove about 90 to 95% of the disulfides and thus materially simplify the final vacuum distillation step. It should be understood, of course, that any known disulfide solvent which is immiscible with aqueous caustic cresylate may be employed instead of naphtha and that with countercurrent extraction, the disulfides, as well as neutral oils and black tarry materials from the black acid, may be removed even more completely than by batch washing.

While an example of my invention and certain test data have been described in considerable detail, it should be understood that this is by way of explanation rather than by way of limitation. While it is important that the initial partial neutralization be at a pH in the range of about 11 to 12.5, alternative operating conditions and procedures may be employed in place of those hereinabove described in subsequent steps, as will be apparent from the above description to those skilled in the art.

I claim:

1. The method of obtaining purified cresylic acid from an aqueous crude caustic cresylate solution containing thio-cresols and mercaptans in the form of cresylates and mercaptides, which method comprises acidifying said solution to a pH in the range of about 11 to 12.5 but sufficiently high to avoid appreciable liberation of cresylic acid from the aqueous caustic phase, oxidizing the acidified caustic cresylate solution to convert the mercaptans to disulfides while the hydrogen ion concentration of the solution is in the range of about pH 11 to pH 12.5, removing most of the resulting disulfides and oily material from the caustic cresylate solution by washing it with a solvent which is immiscible with the aqueous caustic cresylate solution, further acidifying said washed caustic cresylate solution to effect liberation of cresylic acids as a separate phase, separating said separated cresylic acids and subjecting said separated cresylic acids to vacuum distillation to obtain a cresylic acid fraction which is substantially free from water, neutral oil and sulfur.

2. The method of obtaining purified cresylic acid from an aqueous crude caustic cresylate solution containing thiocresols and mercaptans in the form of cresylates and mercaptides, which method comprises acidifying said solution with a refinery acid containing dark color bodies to a pH in the range of about 11 to 12.5 which is sufficiently high to avoid any appreciable phase separation, oxidizing the aqueous acidified caustic cresylate solution to convert the mercaptans to disulfides while the hydrogen ion concentration of the solution is in the range of pH 11 to pH 12.5, washing the oxidized aqueous solution with a hydrocarbon solvent for removing therefrom disulfides produced in the oxidation step, oily material and dark color bodies introduced with the refinery acid, further acidifying said washed caustic cresylate solution with an acid free from color bodies in an amount sufficient to effect liberation of cresylic acids as a separate cresylic acid phase, then distilling said cresylic acid phase under vacuum to obtain a cresylic acid fraction which is substantially free from water, neutral oil and sulfur.

3. The method of claim 2 in which the oxidizing is effected in the absence of added oxidation catalyst and wherein the first named acidifying is to a hydrogen ion concentration of approximately pH 11.

4. The method of claim 2 which includes the additional step of adding a nickel-containing oxidation catalyst for converting mercaptans to disulfides to the caustic cresylate solution after the first named acidifying step and prior to the oxidizing step and wherein the first named acidifying step is to a hydrogen ion concentration of approximately 12.

5. The method of increasing the rate of oxidation and mercaptan number decrease in a process of air blowing a caustic cresylate solution which initially has a hydrogen ion concentration higher than about pH 12.5, which method comprises partially neutralizing said caustic cresylate solution to a hydrogen ion concentration of pH 11 to pH 12.5 but high enough to prevent separation of cresylic acids from the aqueous caustic cresylate phase and air blowing said caustic cresylate solution in the presence of a nickel-containing oxidation catalyst after the partial neutralization step.

6. The method of claim 5 wherein the catalyst is nickel cresylate.

7. In a process for purifying a caustic cresylate solution which contains thio-cresols, mercaptans, neutral oils and water wherein the caustic cresylate solution is subjected to air oxidation at a temperature in the range of 100 to 200° F. for a period of time sufficient to convert substantially all of the mercaptans to disulfides and some neutral oils and most of the disulfides are removed by solvent extraction, the method of decreasing the time required for converting mercaptans to disulfides which method comprises partially neutralizing the caustic cresylate solution to an extent insufficient to cause separation of cresylic acid from said solution prior to subjecting said solution to the air oxidation step and effecting said oxidation in the presence of a nickel-containing oxidation catalyst.

ROBERT M. ALM.

References Cited in the file of this patent

UNITED STATES PATENTS

| Number | Name | Date |
|---|---|---|
| Re. 14,388 | Hawley | Oct. 30, 1917 |
| 2,006,589 | Engel | July 2, 1935 |
| 2,015,038 | Pevere | Sept. 17, 1935 |
| 2,150,656 | Lounsbury | Mar. 14, 1939 |
| 2,163,227 | Hund et al. | June 20, 1939 |
| 2,199,208 | Owen | Apr. 30, 1940 |
| 2,367,172 | Malson | Jan. 9, 1945 |
| 2,391,128 | Cauley et al. | Dec. 18, 1945 |
| 2,394,652 | Alves et al. | Feb. 12, 1946 |

OTHER REFERENCES

Fuson and Snyder: Organic Chemistry, pp. 405–6, John Wiley, New York (1942).